United States Patent [19]
Bradley et al.

[11] Patent Number: 5,995,618
[45] Date of Patent: Nov. 30, 1999

[54] METHOD FOR REDIRECTING TRAFFIC ON A COMMUNICATIONS NETWORK FOR CONSERVATION OF NETWORK RESOURCES

[75] Inventors: James Frederick Bradley, Middletown; Bruce Gilbert Cortez, Marlboro; Cheryl F. Newman, Red Bank; John Paggi, Bayville; David Schmuckler, Lakewood, all of N.J.

[73] Assignee: AT&T Corp, Middletown, N.J.

[21] Appl. No.: 08/679,418

[22] Filed: Jul. 8, 1996

[51] Int. Cl.⁶ .............................. H04M 3/00; H04M 7/00
[52] U.S. Cl. .......................... 379/333; 379/220; 379/269; 379/272; 379/273
[58] Field of Search ................................. 379/133, 211, 379/219, 220, 221, 269, 271, 272, 273, 333

[56] References Cited

U.S. PATENT DOCUMENTS 5,255,315  10/1993  Bushnell ................................. 379/221

FOREIGN PATENT DOCUMENTS 0 674 420 A1  9/1995  European Pat. Off. ....... H04M 11/06
0 696 124 A2  2/1996  European Pat. Off. ......... H04M 3/42

OTHER PUBLICATIONS

S. Saunders, "PBXs and Data: The Second Time Around" *Data Communications*, vol. 22 No. 9, Jun. 1, 1993, pp. 69, 70, 72–74.

*Primary Examiner*—Harry S. Hong

[57] ABSTRACT

A method of operating a switched communications network redirects certain types of messages away from the switch to free up switch resources for other messages, thereby decreasing the size of switch needed or delaying necessary switch size upgrading. Messages are redirected by intelligent concentrators that can connect certain types of messages to their destinations without routing them through the switch. For example, messages between an origination and a destination connected to the same concentrator need not be sent through the switch. Similarly, messages between originations and certain high-volume, long-duration destinations such as data service gateways can be connected directly without passing through the switch. The intelligent concentrators communicate with the switch on a control channel so that the switch remains aware of the status of each origination or destination (e.g., so that it knows not to attempt to route messages to an origination or destination that is in use).

57 Claims, 4 Drawing Sheets

METHOD FOR REDIRECTING TRAFFIC ON A COMMUNICATIONS NETWORK FOR CONSERVATION OF NETWORK RESOURCES

BACKGROUND OF THE INVENTION

This invention relates to switched communications networks. More particularly, this invention relates to a switched communications network in which certain types of call traffic are redirected to avoid the network switch, thereby freeing up switch resources.

One example of a known switched communications network is the public switched telephone network. In that network, individual subscriber lines are connected to a local switching office, which houses a large switch, capable of connecting one subscriber line to another subscriber line or to a trunk line that connects to other switching offices. Each incoming or outgoing line occupies one termination at the local switching office. However, the number of "ports" in the switch—i.e., the number of lines that can be in use at any one time—is smaller than the number of terminations, based on statistical "call blocking" objectives that rely on the fact that not all subscriber lines will be in use at all times, and on the acceptability of the unavailability of a port to a subscriber for a small percentage of the time if the number of lines in use exceeds the number of ports.

Known "call blocking" models are based, inter alia, on certain assumptions regarding the volume and duration of calls. As the product of volume and duration increases, so does the number of ports. The number of ports provided in switches heretofore has been determined based on traditional voice calling patterns.

With the increasing popularity, however, of on-line services such as the Internet, the existing assumption have begun to break down because of the increasing volume of voice-band data calls, which tend to have much longer durations than traditional voice calls. As a result, the number of ports provided in existing switches may soon, if not already, be inadequate. Heretofore, the only remedy for this situation has been the provision of more switch resources, either by providing additional switches, or larger switches. Because of the great expense of telephone switches, that option may not always be practical.

It would be desirable to be able to provide a method for handling increased volumes of calls on a switched communications network using existing switch capacity or with a slower increase in the required switch capacity.

SUMMARY OF THE INVENTION

It is an object of the present invention to provide a method for handling increased volumes of calls on a switched communications network using existing switch capacity or with a slower increase in the required switch capacity.

In accordance with this invention, there is provided a method for use in a switched communications network. The network with which the method is intended to be used has at least one switch for directing message traffic from one of a plurality of originations to one of a plurality of destinations. The switch has resources for handling a predetermined maximum number of message paths at any one time. The network further has (a) at least a first adjunct device associated with the switch for connecting a plurality of originations to the switch and (b) a plurality of destinations connected to the switch, at least some of the destinations being some of the originations. The method effectively allows the exceeding of the predetermined maximum number of message paths without increasing the resources. The method includes receiving a message at the first adjunct device from one of the originations, with the message bearing an address of one of the plurality of destinations. The message is passed from the first adjunct device to the switch. At the switch, it is recognized that the message should be redirected away from the switch based on at least one of (a) that one of originations, (b) the address, (c) information contained in the message, and (d) information stored at the switch. A first signal is sent by the switch to the first adjunct device instructing the first adjunct device to connect the message directly to that one of the plurality of destinations. The message is connected by the first adjunct device to that one of the plurality of destinations, thereby establishing a connection path between that one of the originations and that one of the plurality of destinations.

As used herein, the term "message" refers to a series of signals, all originating in a first location and destined for a second location, that contain both (a) voice or data content to be transferred from the first location to the second location, and (b) data that control how the voice or data content is transferred, such as the address of the destination. The term "message path" as used herein refers to a connection between (a) the switch that is handling a call and (b) one of (i) another switch or (ii) the origin or destination of the call. Therefore, for each switch involved in handling a particular message, there are two message paths. The term "connection path" as used herein refers to a connection between the origin and the destination of a call, including any intervening switch or switches, and any trunks between switches.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention frees up switch resources (e.g., ports) by redirecting certain types of messages away from the switch, handling them elsewhere. The description that follows will be set in the context of the public switched telephone network, but the invention is applicable to any type of switched network.

Figure 1:
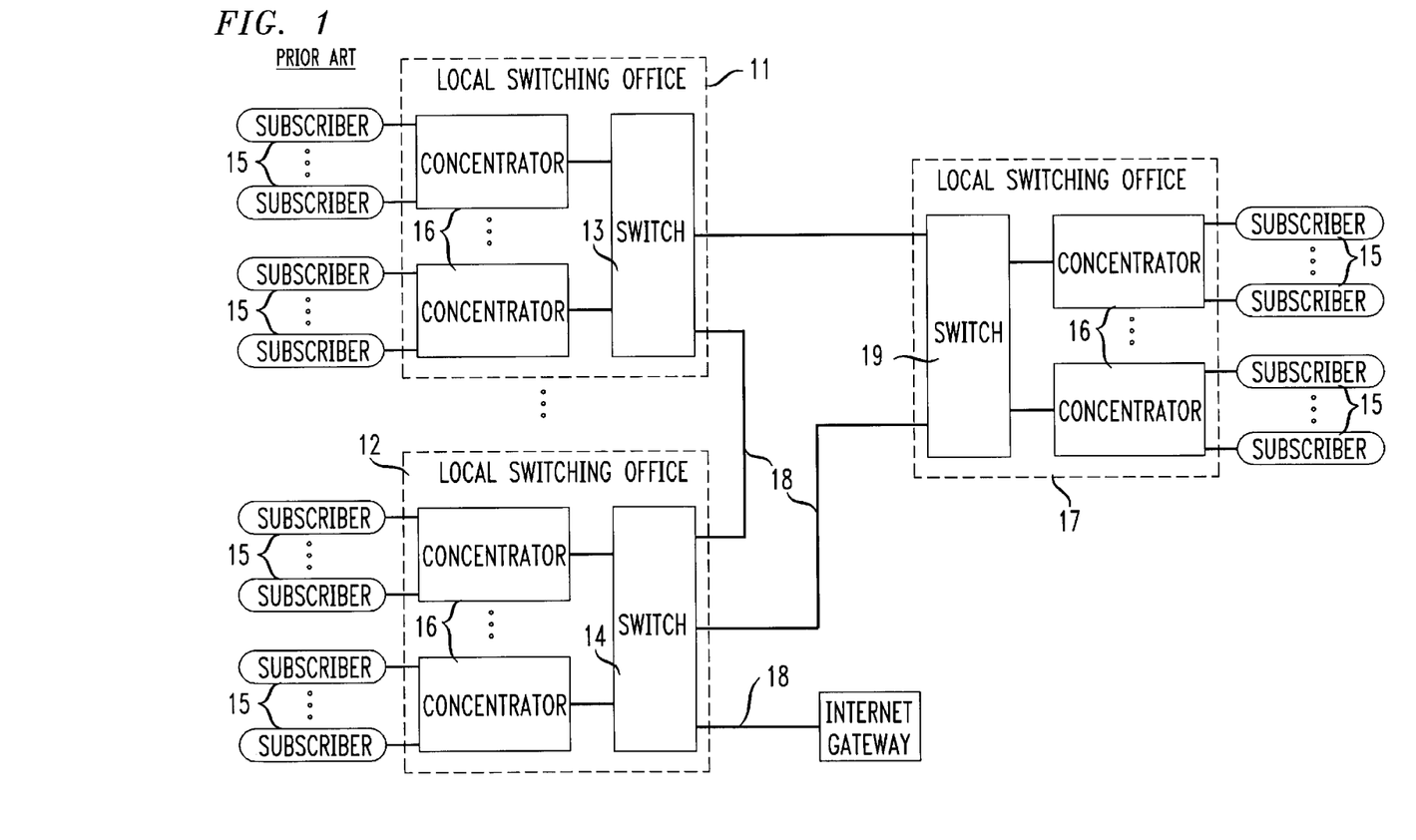
FIG. 1 is a schematic representation of a known telephone network configuration for illustrating a known method of completing a data call.

A known telephone network architecture is shown in schematic form in FIG. 1. The network 10 includes a plurality of local switching offices 11, 12, 17 (three shown). Each local switching office 11, 12, 17 includes a switch 13, 14, 19 that serves a plurality of subscribers 15. Switches 13, 14, 19 preferably are special purpose computers configured for electronic switching of messages. One suitable electronic switching system is that sold under the trademark 5ESS® by Lucent Technologies, but other similar electronic switching systems may also be used. Although each subscriber 15 may be connected directly to a respective switch 13, 14, 19, subscribers 15 preferably are connected to switches 13, 14, 19 through concentrators 16. Concentrator 16, which reduces the number of terminations required at switch 13, 14, 19 itself, may be a conventional digital loop carrier (DLC) or other suitable conventional device as may be apparent to one of skill in the art. Concentrators 16 may be located physically in the same building as switch 13, 14, 19, or they may be distributed in the field.

Each of the local switching offices 11, 12, 17, in known system 10 is connected to other local switching offices 11, 12, 17, by trunks 18. An Internet gateway 19, operated by an Internet service provider, could be connected to a particular local office 12.

In a system such as known system 10, each call that is completed consumes at least two ports for the duration of the call—an incoming port and an outgoing port at the switch to which the originating subscriber is connected, and (if the destination is on a different switch) an incoming port and an outgoing port at the switch to which the destination is connected, whether the destination is another ordinary subscriber, or an Internet gateway or other data service. As stated above, the amount of such resources provided in a system is based on statistical assumptions regarding how many calls will be made and how long they will last. Calls that last significantly longer than the statistically predicted duration can result in temporary shortages of system resources, during which subscribers may be blocked from receiving or originating calls, or both. Another type of call that can tie up system resources, and that can be addressed by the present invention, is a lengthy call between neighbors—e.g., between teenagers in homes near one another. Either of these types of calls can require that additional switching resources be deployed, often at great expense.

Figure 2:
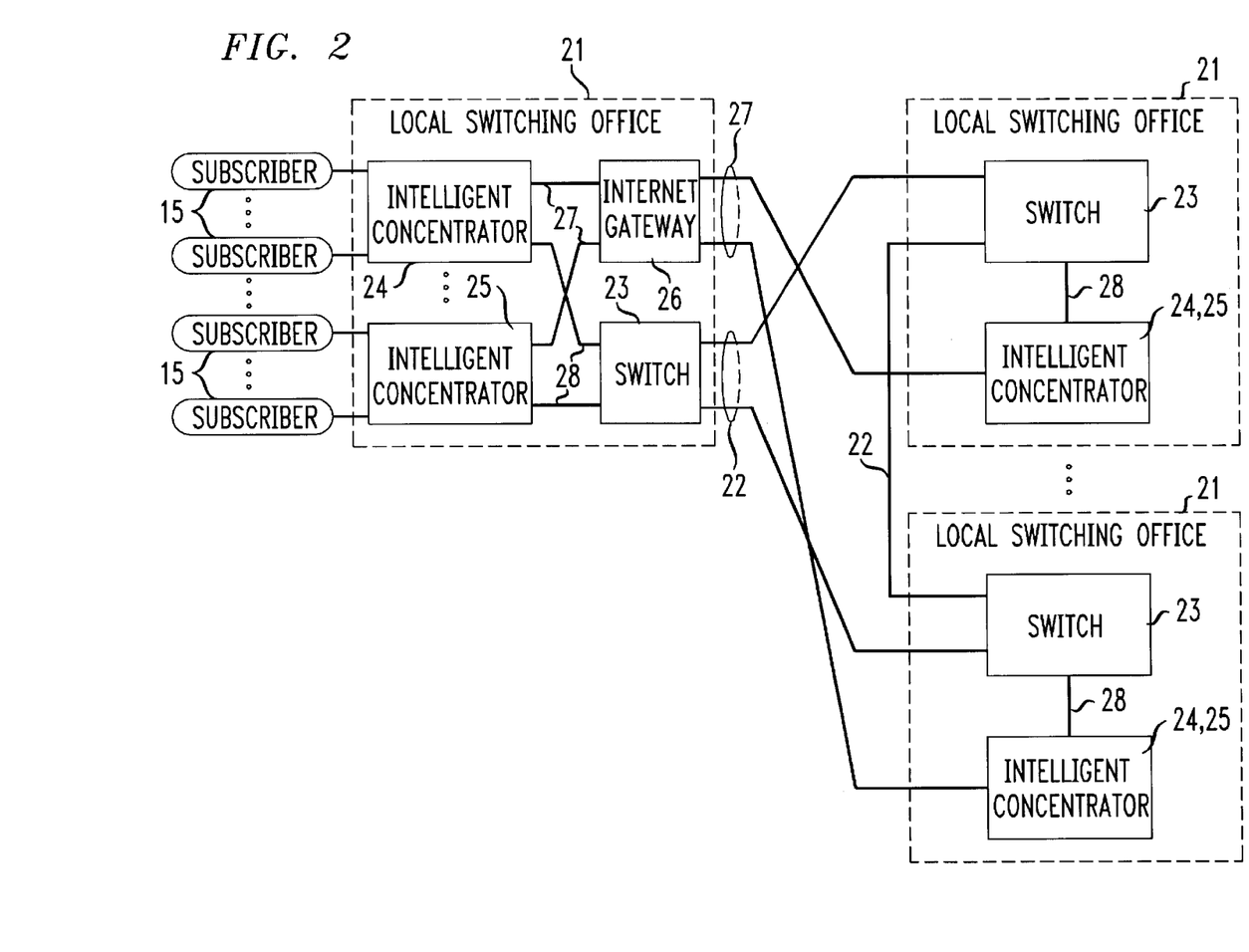
FIG. 2 is a schematic diagram of a telephone network configuration for illustrating a preferred embodiment of the method according to the present invention.

A system 20 for implementing a call redirection method according to the invention that reduces the need for additional switch resources to handle such call traffic is shown in FIG. 2. In system 20, a plurality of local switching offices 21 (one shown in detail) are interconnected by trunks 22.

Each local switching office 21 has a switch 23, preferably similar to switches 13, 14, 19. Local switching office 21 also includes a plurality of intelligent concentrators ("iDLC") 24, 25, which may be similar to DLCs 16, but modified to perform the functions described below. The modified, intelligent concentrators 24, 25 preferably have the ability to communicate with switch 23 on channels such as those of a Basic Rate Interface Integrated Services Digital Network ("Basic Rate Interface ISDN" or "BRI") connection 28. Each intelligent concentrator 24, 25 preferably also has some limited call connection capabilities, such as the ability to connect calls between two lines that are both connected to it, or between a line connected to it and a direct connection between it and another device.

As discussed above in connection with system 10, intelligent concentrators 24, 25 can be in the same building as switch 23, or can distributed in the field. In addition, they could be incorporated within switch 23 itself. In short, a system with which the present invention can be used can include any device adjunct to switch 23 that performs the functions of intelligent concentrators 24, 25 as described above. Other conventional components, as may be required, such as a Digital Cross-Connect System (DCS), may also be included in local switching office 21, as would be apparent to one of ordinary skill in the art.

System 20 also preferably includes an Internet gateway 26 housed in at least one of local switching offices 21. Gateway 26 preferably is connected to intelligent concentrators 24, 25 of the local switching office in which it is housed, and preferably also to intelligent concentrators 24, 25 of other nearby switching offices 21, by connections 27. Communications on connections 27 preferably are carried out using protocol conversion techniques, and particularly packet-switching techniques such as Asynchronous Transfer Mode ("ATM") techniques. Other fast-packet techniques, such as frame relay techniques, may be used.

Figure 3:
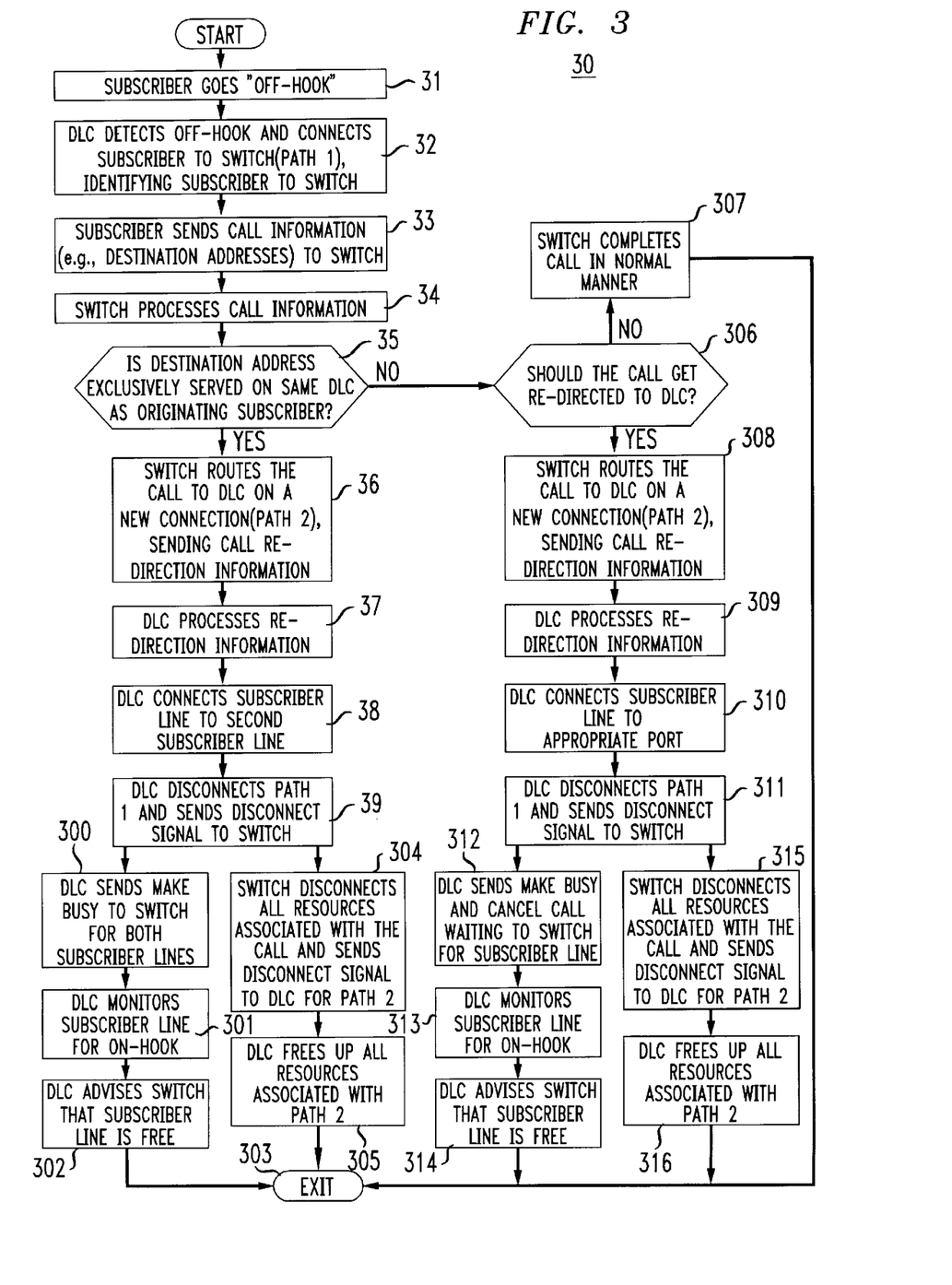
FIG. 3 is a flow diagram illustrating a preferred embodiment of the method according to the present invention.

The operation of a preferred embodiment of the method 30 according to the present invention is illustrated in FIG. 3.

Method 30 starts at step 31 where a subscriber 15 initiates a call or message by causing his telephone equipment to "go off-hook." This call could be an ordinary voice telephone call, or it could be a voice-band data call to an online data service such as an Internet service provider. This call is handled in the first instance by intelligent concentrator ("iDLC") 24, 25 to which the subscriber 15 is connected. At step 32, intelligent concentrator 24, 25 detects that subscriber 15 is off-hook, connects the call to switch 23 on a first message path, and identifies subscriber 15 to switch 23. At this point, switch 23 provides dial tone to the subscriber line (cf. FIG. 4 at 40).

At step 33, subscriber 15 enters address information (e.g., a telephone number, or another form of address in a non-telephony application) for the destination of the call, and that information is sent to switch 23. At step 34, switch 23 examines the address of the destination entered by subscriber 15 and initiates processing of the call. That processing includes comparing the address to various databases stored in its memory. Those databases preferably identify which types of calls can or should be recognized as suitable for being redirected away from the switch to free up switch resources. As discussed above, this could include (a) calls to Internet service providers or any other large destination to which many users call and remain connected for long periods (e.g., airline "800" reservation numbers), or (b) calls to other subscribers attached to the same intelligent concentrator 24, 25.

Thus, at test 35, the destination address is examined to determine whether or not it is attached to the same intelligent concentrator 24, 25 as the calling subscriber. This determination preferably would be made using a feature supported by switch 23 that allows the switch to compare entered telephone numbers to a database of stored numbers for a particular purpose. If it is determined that the destination address is attached to the same intelligent concentrator 24, 25 as the calling subscriber, the method proceeds to step 36 in which the switch returns the call to that intelligent concentrator 24, 25 on a second message path, along with redirection information. Next, at step 37, intelligent concentrator 24, 25 processes the redirection information, with the result that at step 38 intelligent concentrator 24, 25 completes the call, connecting the originating subscriber to the destination subscriber. At substantially the same time, at step 39, intelligent concentrator 24, 25 disconnects the first message path and sends a disconnect signal to switch 23. Next, at step 300, intelligent concentrator 24, 25 sends a signal to switch 23 indicating that the two subscribers' lines are busy. In this way, switch 23 need not handle the call at all, freeing up two ports for other calls. However, switch 23 is aware that the two subscribers' lines are busy, and will not attempt to connect any incoming calls to either of the two subscribers. Until advised otherwise as discussed below, the switch maintains status information indicating that the lines are busy, as it would if it were handling the call (cf. FIG. 4 at 41).

At step 301, the intelligent concentrator 24, 25 continually monitors the subscriber lines until it detects an on-hook condition, indicating that the call has been terminated. When that occurs (cf. FIG. 4 at 44), then at step 302 the intelligent concentrator 24, 25 advises switch 23 that each subscriber line is no longer busy, and method 30 ends at 303 as far as intelligent concentrator 24, 25 is concerned.

While intelligent concentrator 24, 25 is carrying out steps 300–302, switch 23 at step 304 disconnects all switch resources associated with the call being processed and sends a disconnect signal to intelligent concentrator 24, 25 with respect to the second message path. This allows intelligent concentrator 24, 25 at step 305 to free up all intelligent concentrator resources associated with the second message path, which was originally initiated by switch 23 and which intelligent concentrator 24, 25 therefore could not terminate on its own. Step 305 is ordinarily complete before step 302. After step 302, the switch updates its status information for the subscriber line (cf. FIG. 4 at 42) and method 30 ends at 303 as far as switch 23 is concerned.

If, at test 35, it is determined that the destination address is not served by the same concentrator 24, 25, then the method proceeds to test 306 to determine whether or not the call should nevertheless be redirected to intelligent concentrator 24, 25 for some other reason—e.g., the destination is an Internet gateway or similar data service (or one of the other types of special destinations referred to above). Preferably, this test is accomplished using the currently available feature of switch 23 (e.g., the Customized Dialing Plan, or "CDP" feature of a 5ESS® switch) which, on a per-subscriber basis, can be set to forward particular calls to alternate addresses; all Internet gateway subscribers would thus have that feature activated for their lines, with the phone number of the Internet gateway programmed for redirection to a telephone number that represents intelligent concentrator 24, 25. Alternatively, and more generally, this test could be accomplished by providing new function in switch 23 to examine certain information stored at switch 23 to determine if redirection is required. For example, switch 23 could conduct a comparison of the destination address to a list of addresses known to switch 23 (i.e., stored in its memory) to belong to data service gateways (or other special destinations). Another type of "trigger" for redirection of the call could be some information in the call itself. For example, if the originating subscriber has ISDN service, the call will include information indicating the type of customer premises equipment that has originated the call. Switch 23 may be programmed to recognize that for certain types of devices, all calls should be redirected. As yet another alternative, there may be situations where any call from a certain origination should be redirected.

If at test 300 the destination is not a data service gateway (or other special destination), then the call must be an ordinary call, which is handled by switch 23 at step 307 in the ordinary course, and method 30 ends at 303.

If at test 306 it is determined that the call should be redirected to intelligent concentrator 24, 25, then the system proceeds to step 308, where the switch routes the call to intelligent concentrator 24, 25 on a second message path along with redirection information. Next, at step 309, intelligent concentrator 24, 25 processes the redirection information, with the result that at step 310 intelligent concentrator 24, 25 completes the call, connecting the originating subscriber to the appropriate port. In the case of a voice-band data call to an online service provider, the appropriate port would preferably be a port connected to one of connections 27. At that point, the subscriber can log onto the online service (see FIG. 4 at 43).

As set forth above, connections 27 preferably operate using a fast packet-switching technique (such as ATM). Having this portion of a data call—i.e., the portion between intelligent concentrator 24, 25 and the gateway that bypasses the switch—operate using a technique such as ATM, which is particularly well-suited to efficient data communication, enhances the efficiency of method according to the invention. At least some of those advantages could be obtained by using other protocol conversion techniques such as idle information suppression.

At substantially the same time, at step 311, intelligent concentrator 24, 25 disconnects the first message path and sends a disconnect signal to switch 23. Next, at step 312, intelligent concentrator 24, 25 sends a signal to switch 23 indicating that the subscriber's line is busy. Until advised otherwise as discussed below, the switch maintains status information indicating that the lines are busy, as it would if it were handling the call (see FIG. 4 at 41). In this way, switch 23 need not handle the call at all, freeing up two ports for other calls. However, switch 23 is aware that the subscriber's line is busy, and will not attempt to connect any incoming calls to that subscriber, just as described above in connection with the case of two subscribers on the same intelligent concentrator. However, here treatment of "Call Waiting" service is preferably different. Because this is a data call (which is known to switch 23 as a result of test 306; the redirection information at step 309 would have to inform intelligent concentrator 24, 25 of this fact), then at step 312 intelligent concentrator 24, 25 also sends a "Cancel Call Waiting" signal to the switch for the subscriber line, to disable Call Waiting service if activated for that line. Otherwise, an incoming Call Waiting tone may disrupt the data call.

At step 313, intelligent concentrator 24, 25 continually monitors the subscriber line until it detects an on-hook condition, indicating that the call has been terminated. When that occurs (see FIG. 4 at 44), then at step 314 intelligent concentrator 24, 25 advises switch 23 that the subscriber line is no longer busy, and that "Call Waiting," if disabled, can be re-enabled for the subscriber's line, and method 30 ends at 303 as far as intelligent concentrator 24, 25 is concerned.

While intelligent concentrator 24, 25 is carrying out steps 312–314, switch 23 at step 315 disconnects all switch resources associated with the call being processed and sends a disconnect signal to intelligent concentrator 24, 25 with respect to the second message path. This allows intelligent concentrator 24, 25 at step 316 to free up all intelligent concentrator resources associated with the second message path, which was originally initiated by switch 23 and which intelligent concentrator 24, 25 therefore could not terminate on its own. Step 316 is ordinarily complete before step 314. After step 314, the switch updates its status information for the subscriber line (see FIG. 4 at 42) and method 30 ends at 303 as far as switch 23 is concerned.

Figure 4:
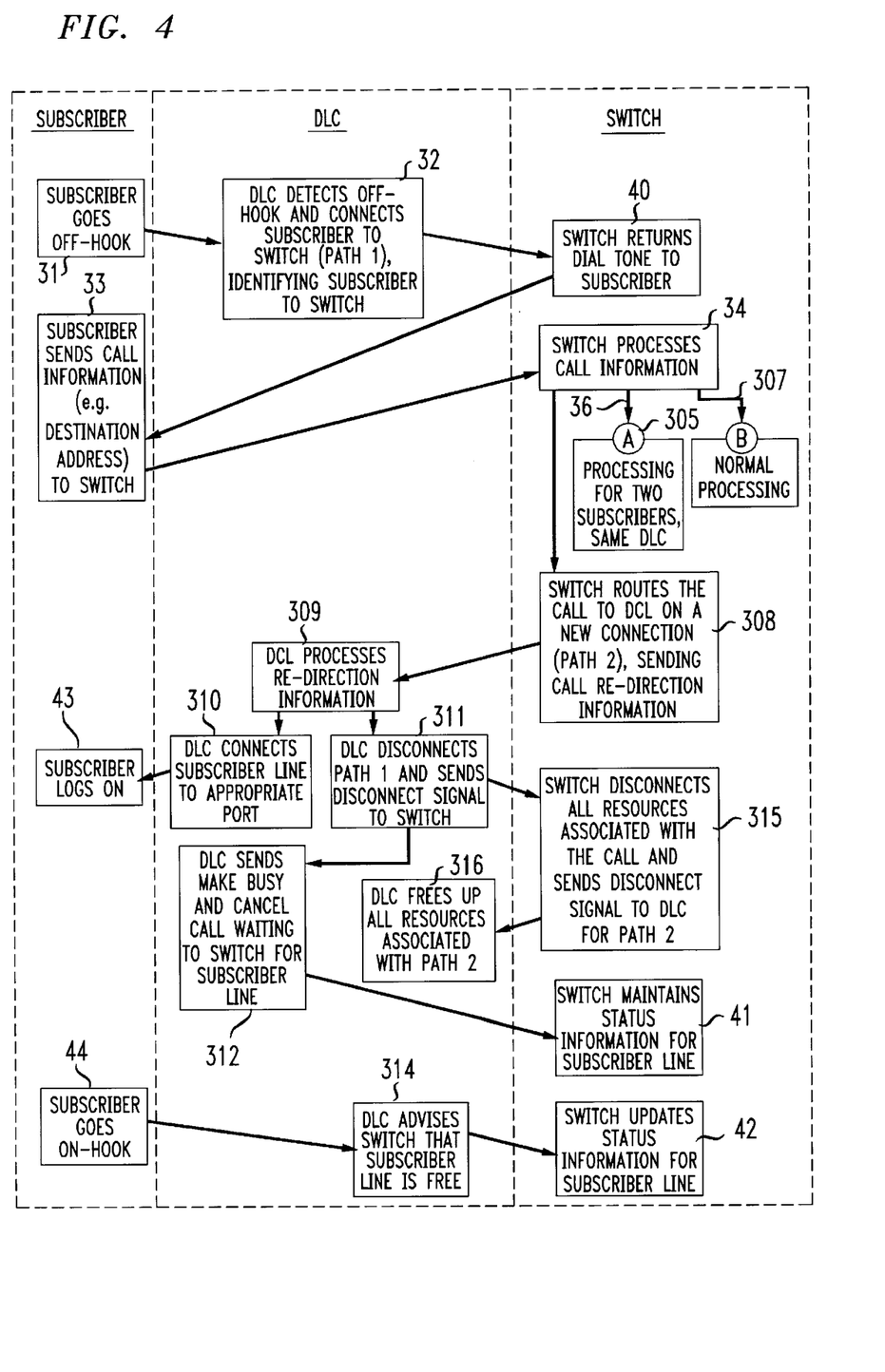
FIG. 4 is a diagram showing the breakdown of functions among various network components during operation of the method of FIG. 3.

Method 30 is also illustrated in FIG. 4. In this representation, only the case of a call to a special destination, such as an online service gateway, is depicted. FIG. 4 is arranged to show the division of activity among the subscriber, intelligent concentrator 24, 25 and switch 23, and signaling and control links between intelligent concentrator 24, 25 and switch 23. FIG. 4 also shows the temporal sequence of activities performed by the subscriber, intelligent concentrator 24, 25 and switch 23.

Although the method according to the invention has been described with reference to the embodiment illustrated in FIGS. 3 and 4, where the types of calls that are redirected from switch 23 are either (a) calls between subscribers on the same concentrator 24, 25, or (b) calls to data service gateways or other special destinations, other embodiments are possible in which only one of those types of calls is redirected, or in which other types of calls are handled in addition to or instead of those types of calls. Moreover, although the invention has been described in connection with a telephone network, it is applicable to any switched communications network in which there is a type of message suitable for redirecting away from the switch.

While the method of the invention has been described in the context of voice calls and voice-band data calls, it should be understood that the invention applies to any situation where there is a desire to redirect calls away from the switch, particularly, but not exclusively, because of long call durations. For example, in ISDN service, certain of the many types of calls that could be made might be candidates for redirection in the manner of the present invention.

Thus it is seen that a method for handling increased volumes of calls on a switched communications network using existing switch capacity, or with a slower increase in the required switch capacity, has been provided. One skilled in the art will appreciate that the present invention can be practiced by other than the described embodiments, which are presented for purposes of illustration and not of limitation, and the present invention is limited only by the claims which follow.

What is claimed is:

1. A method for use in a switched communications network, said network having at least one switch for directing message traffic from one of a plurality of originations to one of a plurality of destinations, said switch having resources for handling a predetermined maximum number of message paths at any one time, said network further having (a) at least a first adjunct device associated with said switch for connecting a plurality of said originations to said switch and (b) a plurality of destinations connected to said switch, at least some of said destinations being some of said originations, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing, at said switch, that said message should be redirected away from said switch, based on at least one of (a) said one of said originations, (b) said address, (c) information contained in said message, and (d) information stored at said switch;

sending a first signal from said switch to said first adjunct device; and routing said message, based on receipt of said first signal at said first adjunct device, from said first adjunct device to said one of a plurality of destinations, thereby establishing a connection path between said one of said originations and said one of said plurality of destinations, wherein when said connection path is established, sending a second signal from said first adjunct device to said switch advising said switch that said one of said originations is busy; and when said connection path is terminated, sending a third signal from said first adjunct device to said switch, advising said switch that said one of said originations is available.

2. The method of claim 1 wherein:

said one of a plurality of destinations is another of said originations connected to said switch by said first adjunct device through which said one of said originations is connected; and said routing step comprises connecting said message back from said first adjunct device to said another of said originations.

3. The method of claim 2 wherein said recognizing step comprises storing in memory associated with said switch an identification of which originations are connected through which of said at least a first adjunct device.

4. The method of claim 2 wherein said identification is a telephone number.

5. The method of claim 2 further comprising the steps of:

when said connection path is established, sending a second signal from said first adjunct device to said switch advising said switch that said one of said originations is busy; and when said connection path is terminated, sending a third signal from said first adjunct device to said switch, advising said switch that said one of said originations is available.

6. The method claim 5 further comprising the steps of:

when said connection path is established, sending a fourth signal from said first adjunct device to said switch advising said switch that said another of said originations is busy; and when said connection path is terminated, sending a fifth signal from said first adjunct device to said switch, advising said switch that said another of said originations is available.

7. A method for use in a switched communications network, said network having at least one switch for directing message traffic from one of a plurality of originations to one of a plurality of destinations, said switch having resources for handling a predetermined maximum number of message paths at any one time, said network further having (a) at least a first adjunct device associated with said switch for connecting a plurality of said originations to said switch and (b) a plurality of destinations connected to said switch, at least some of said destinations being some of said originations, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing at said switch, that said message should be redirected away from said switch, based on at least one of (a) said one of said originations, (b) said address, (c) information contained in said message, and (d) information stored at said switch;

sending a first signal from said switch to said first adjunct device; and routing said message, based on receipt of said first signal at said first adjunct device, from said first adjunct device to said one of a plurality of destinations, thereby establishing a connection path between said one of said originations and said one of said plurality of destinations, said one of a plurality of destinations is a frequent destination of messages from said plurality or originations, said one of a plurality of destinations being connected to said switch and having direct connections to each said at least one first adjunct device; and said routing step comprises connecting said message for said one of a plurality of destinations over one of said direction connections.

8. The method of claim 7 wherein said recognizing step comprises storing in memory associated with said switch an identification of each of said plurality of destinations that is a frequent destination, messages for which should be redirected away from said switch.

9. The method of claim 7 wherein said one of said direct connections operates using protocol conversion.

10. The method of claim 9 wherein:

said one of said direct connections is a packet-switched connection; and said routing step comprises connecting said message using packet switching protocols.

11. The method of claim 10 wherein said routing step comprises routing said message using asynchronous transfer mode protocols.

12. The method of claim 7 wherein said one of a plurality of destinations is connected to said switch by a second adjunct device having said direct connections to said at least one first adjunct device.

13. The method of claim 7 wherein said identification is a telephone number.

14. The method of claim 7 further comprising the steps of:

when said connection path is established, sending a second signal from said first adjunct device to said switch advising said switch that said one of said originations is busy; and when said connection path is terminated, sending a third signal from said first adjunct device to said switch, advising said switch that said one of said originations is available.

15. A method for use in a switched communications network, said network having at least one switch for directing message traffic from one of a plurality of originations to one of a plurality of destinations, said switch having resources for handling a predetermined maximum number of message paths at any one time, said network further having (a) at least a first adjunct device associated with said switch for connecting a plurality of said originations to said switch and (b) a plurality of destinations connected to said switch, at least some of said destinations being some of said originations, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing, at said switch, that said message should be redirected away from said switch, based on at least one of (a) said one of said originations (b) said address, (c) information contained in said message, and (d) information stored at said switch;

sending a first signal from said switch to said first adjunct device;

routing said message, based on receipt of said first signal at said first adjunct device, from said first adjunct device to said one of a plurality of destinations, thereby establishing a connection path between said one of said originations and said one of said plurality of destinations;

establishing a control channel between said switch and said first adjunct device; and sending said signal on said control channel.

16. A method for use in a switched telephone network, said network having at least one switch for directing message traffic from one of a plurality of subscribers to one of a plurality of destinations, said switch having resources for handling a predetermined maximum number of message paths at any one time, said network further having (a) at least a first adjunct device associated with said switch for connecting a plurality of said subscribers to said switch, and (b) a plurality of destinations connected to said switch at least some of said destinations being some of said subscribers, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said one of said subscribers, (b) said telephone number, (c) information contained in said message, and (d) information stored at said switch;

sending a first signal from said switch to said first adjunct device; and routing said message, based on receipt of said signal at said first adjunct device, from said first adjunct device to said one of a plurality of destinations, thereby establishing a connection path between said one of said subscribers and said one of said plurality of destinations, wherein when said connection path is established, sending a second signal from said first adjunct device to said switch advising said switch that said one of said subscribers is busy; and when said connection path is terminated, sending a third signal from said first adjunct device to said switch, advising said switch that said one of said subscribers is available.

17. A method for use in a switched telephone network, said network having at least one switch for directing message traffic from one of a plurality of subscribers to one of a plurality of destinations, said switch having resources for handling a predetermined maximum number of message paths at any one time, said network further having (a) at least a first adjunct device associated with said switch for connecting a plurality of said subscribers to said switch, and (b) a plurality of destinations connected to said switch at least some of said destinations being some of said subscribers, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing at said switch, that said message should be redirected away from said switch, based on at least one of (a) said one of said subscribers, (b) said telephone number, (c) information contained in said message, and (d) information stored at said switch;

sending a first signal from said switch to said first adjunct device; and routing said message, based on receipt of said signal at said first adjunct device, from said first adjunct device to said one of a plurality of destinations, thereby establishing a connection path between said one of said subscribers and said one of said plurality of destinations wherein:

said one of a plurality of destinations is another of said subscribers connected to said switch by said first adjunct device through which said one of said subscribers is connected; and said routing step comprises connecting said message back from said first adjunct device to said another of said subscribers.

18. The method of claim 17 wherein said recognizing step comprises storing in memory associated with said switch an identification by telephone number of which subscriber is connected through which of said at least a first adjunct device.

19. The method of claim 17 further comprising the steps of:

when said connection path is established, sending a second signal from said first adjunct device to said switch advising said switch that said one of said subscribers is busy; and when said connection path is terminated, sending a third signal from said first adjunct device to said switch, advising said switch that said one of said subscribers is available.

20. The method of claim 19 further comprising the steps of:

when said connection path is established, sending a fourth signal from said first adjunct device to said switch advising said switch that said another of said subscribers is busy; and when said connection path is terminated, sending a fifth signal from said first adjunct device to said switch, advising said switch that said another of said subscribers is available.

21. A method for use in a switched telephone network, said network having at least one switch for directing message traffic from one of a plurality of subscribers to one of a plurality of destinations, said switch having resources for handling a predetermined maximum number of message paths at any one time, said network further having (a) at least a first adjunct device associated with said switch for connecting a plurality of said subscribers to said switch, and (b) a plurality of destinations connected to said switch at least some of said destinations being some of said subscribers, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said one of said subscribers, (b) said telephone number, (c) information contained in said message, and (d) information stored at said switch;

sending a first signal from said switch to said first adjunct device; and routing said message, based on receipt of said signal at said first adjunct device, from said first adjunct device to said one of a plurality of destinations, thereby establishing a connection path between said one of said subscribers and said one of said plurality of destinations wherein:

said one of a plurality of destinations is a frequent destination of messages from said plurality of subscribers, said one of a plurality of destinations being connected to said switch and having direct connections to each said at least one first adjunct device; and said routing step comprises connecting said message for said one of a plurality of destinations over one of said direct connections.

22. The method of claim 21 wherein said recognizing step comprises storing in memory associated with said switch an identification by telephone number of each of said plurality of destinations that is a frequent destination, messages for which should be redirected away from said switch.

23. The method of claim 21 wherein said one of said direct connections operates using protocol conversion.

24. The method of claim 23 wherein:

said one of said direct connections is a packet-switched connection; and said routing step comprises connecting said message using packet switching protocols.

25. The method of claim 24 wherein said routing step comprises connecting said message using asynchronous transfer mode protocols.

26. The method of claim 21 wherein said one of a plurality of destinations is connected to said switch by a second adjunct device having said direct connections to said at least one first adjunct device.

27. The method of claim 21 wherein said frequent destination is an access point of a public data network.

28. The method of claim 21 further comprising the steps of:

when said connection path is established, sending a second signal from said first adjunct device to said switch advising said switch that said one of said subscribers is busy; and when said connection path is terminated, sending a third signal from said first adjunct device to said switch, advising said switch that said one of said subscribers is available.

29. A method for use in a switched telephone network, said network having at least one switch for directing message traffic from one of a plurality of subscribers to one of a plurality of destinations, said switch having resources for handling a predetermined maximum number of message paths at any one time, said network further having (a) at least a first adjunct device associated with said switch for connecting a plurality of said subscribers to said switch, and (b)

a plurality of destinations connected to said switch at least some of said destinations being some of said subscribers, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said one of said subscribers, (b) said telephone number, (c) information contained in said message, and (d) information stored at said switch;

sending a first signal from said switch to said first adjunct device;

routing said message, based on receipt of said signal at said first adjunct device, from said first adjunct device to said one of a plurality of destinations, thereby establishing a connection path between said one of said subscribers and said one of said plurality of destination;

establishing a control channel between said switch and said first adjunct device; and     sending said control signal on said control channel.

30. A method for use in a switched communications network, said communications network having at least one switch for directing message traffic from one of a plurality of originations to a destination comprising one of (a) one of a plurality of other originations, and (b) a gateway of a public data network, said switch having resources for handling a predetermined maximum number of message paths at any one time, said communications network further having (a) at least a first adjunct device associated with said switch for connecting a plurality of said originations to said switch, and (b) a plurality of destinations connected to said switch, at least one of said destinations being some of said originations and at least one of said destinations being a gateway of a public data network, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing, at said switch, that said message should be redirected away from said switch, based on at least one of (a) said one of said originations (b) said address, (c) information contained in said message, and (d) information stored at said switch;

sending a first signal from said switch to said first adjunct device; and     routing said message, based on receipt at said first adjunct device of said first signal, from said first adjunct device to said one of a plurality of destinations, thereby establishing a connection path between said one of said originations and said one of said plurality of destinations, wherein     when said connection path is established, sending a second signal from said first adjunct device to said switch advising said switch that said one of said originations is busy; and     when said connection path is terminated, sending a third signal from said first adjunct device to said switch, advising said switch that said one of said originations is available.

31. A method for use in a switched communications network, said communications network having at least one switch for directing message traffic from one of a plurality of originations to a destination comprising one of (a) one of a plurality of other originations, and (b) a gateway of a public data network, said switch having resources for handling a predetermined maximum number of message paths at any one time, said communications network further having (a) at least a first adjunct device associated with said switch for connecting a plurality of said originations to said switch, and (b) a plurality of destinations connected to said switch, at least one of said destinations being some of said originations and at least one of said destinations being a gateway of a public data network, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing, at said switch, that said message should be redirected away from said switch, based on at least one of (a) said one of said originations, (b) said address, (c) information contained in said message, and (d) information stored at said switch;

sending a first signal from said switch to said first adjunct device; and     routing said message, based on receipt at said first adjunct device of said first signal, from said first adjunct device to said one of a plurality of destinations, thereby establishing a connection path between said one of said originations and said one of said plurality of destinations wherein:

said one of a plurality of destinations is another of said originations connected to said switch by said first adjunct device through which said one of said originations is connected; and     said routing step comprises connecting said message back from said first adjunct device to said another of said originations.

32. The method of claim 31 wherein said recognizing step comprises storing in memory associated with said switch an identification by address of which originations are connected through which of said at least a first adjunct device.

33. The method of claim 31 wherein said identification is a telephone number.

34. The method of claim 31 further comprising the steps of:

when said connection path is established, sending a second signal from said first adjunct device to said switch advising said switch that said one of said originations is busy; and     when said connection path is terminated, sending a third signal from said first adjunct device to said switch, advising said switch that said one of said originations is available.

35. The method of claim 34 further comprising the steps of:

when said connection path is established, sending a fourth signal from said first adjunct device to said switch advising said switch that said another of said originations is busy; and     when said connection path is terminated, sending a fifth signal from said first adjunct device to said switch, advising said switch that said another of said originations is available.

36. A method for use in a switched communications network, said communications network having at least one switch for directing message traffic from one of a plurality of originations to a destination comprising one of (a) one of a plurality of other originations, and (b) a gateway of a public data network, said switch having resources for handling a predetermined maximum number of message paths at any one time, said communications network further having (a) at least a first adjunct device associated with said switch for connecting a plurality of said originations to said switch, and (b) a plurality of destinations connected to said switch, at least one of said destinations being some of said originations and at least one of said destinations being a gateway of a public data network, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing, at said switch, that said message should be redirected away from said switch, based on at least one of (a) said one of said originations, (b) said address, (c) information contained in said message, and (d) information stored at said switch;

sending a first signal from said switch to said first adjunct device; and routing said message, based on receipt at said first adjunct device of said first signal, from said first adjunct device to said one of a plurality of destinations, thereby establishing a connection path between said one of said originations and said one of said plurality of destinations, wherein:

said one of a plurality of destinations is said gateway of a public data network, said public data network being connected to said switch and having a direct connection to each said at least one first adjunct device; and said routing step comprises connecting said message for said public data network over one of said direct connections.

37. The method of claim 36 wherein said recognizing step comprises storing in memory associated with said switch an identification by address of said public data network, messages for which should be redirected away from said switch.

38. The method of claim 36 wherein said identification is a telephone number.

39. The method of claim 36 wherein said one of a plurality of destinations is connected to said switch by a second adjunct device having said direct connections to said at least one first adjunct device.

40. The method of claim 36 wherein said one of said direct connections operates using protocol conversion.

41. The method of claim 40 wherein:

said one of said direct connections is a packet-switched connection; and said routing step comprises connecting said message using packet switching protocols.

42. The method of claim 41 wherein said routing step comprises connecting said message using asynchronous transfer mode protocols.

43. The method of claim 36 further comprising the steps of:

when said connection path is established, sending a second signal from said first adjunct device to said switch advising said switch that said one of said originations is busy; and when said connection path is terminated, sending a third signal from said first adjunct device to said switch, advising said switch that said one of said originations is available.

44. A method for use in a switched communications network, said communications network having at least one switch for directing message traffic from one of a plurality of originations to a destination comprising one of (a) one of a plurality of other originations, and (b) a gateway of a public data network, said switch having resources for handling a predetermined maximum number of message paths at any one time, said communications network further having (a) at least a first adjunct device associated with said switch for connecting a plurality of said originations to said switch, and (b) a plurality of destinations connected to said switch, at least one of said destinations being some of said originations and at least one of said destinations being a gateway of a public data network, said method being for effectively exceeding said predetermined maximum number of message paths without increasing said resources, said method comprising the steps of:

receiving a message at said first adjunct device from one of said originations, said message bearing an address of said one of a plurality of destinations;

passing said message from said first adjunct device to said switch;

recognizing at said switch, that said message should be redirected away from said switch, based on at least one of (a) said one of said originations, (b) said address, (c) information contained in said message, and (d) information stored at said switch;

sending a first signal from said switch to said first adjunct device;

routing said message, based on receipt at said first adjunct device of said first signal, from said first adjunct device to said one of a plurality of destinations, thereby establishing a connection path between said one of said originations and said one of said plurality of destinations;

establishing a control channel between said switch and said first adjunct device; and sending said control signal on said control channel.

45. A method for use in a switched telephone network, said telephone network having at least one switch for directing message traffic from one of a plurality of subscribers to a destination comprising one of (a) one of a plurality of other subscribers, and (b) a gateway of a public data network, said switch having resources for handling a predetermined maximum number of message paths at any one time, said telephone network further having (a) at least a first adjunct device associated with said switch for connecting a plurality of said subscribers to said switch and (b) a plurality of destinations connected to said switch, at least some of said destinations being some of said subscribers and at least one of said destinations being a gateway of a public data network, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said subscribers. (b) said telephone number, (c) information contained in said message, and (d) information stored at said switch;

sending a first signal from said switch to said first adjunct device instructing said first adjunct device to connect said message directly to said one of a plurality of destinations; and routing said message from said first adjunct device to said one of a plurality of destinations, thereby establishing a connection path between said one of said subscribers and said one of said plurality of destinations, wherein when said connection path is established, sending a second signal from said first adjunct device to said switch advising said switch that said one of said subscribers is busy; and when said connection path is terminated, sending a third signal from said first adjunct device to said switch, advising said switch that said one of said subscribers is available.

46. A method for use in a switched telephone network, said telephone network having at least one switch for directing message traffic from one of a plurality of subscribers to a destination comprising one of (a) one of a plurality of other subscribers, and (b) a gateway of a public data network, said switch having resources for handling a predetermined maximum number of message paths at any one time, said telephone network further having (a) at least a first adjunct device associated with said switch for connecting a plurality of said subscribers to said switch and (b) a plurality of destinations connected to said switch, at least some of said destinations being some of said subscribers and at least one of said destinations being a gateway of a public data network, said method being for effectively exceeding said predetermined maximum number of message paths without increasing said resources said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said subscribers, (b) said telephone number, (c) information contained in said message, and (d) information stored at said switch;

sending a first signal from said switch to said first adjunct device instructing said first adjunct device to connect said message directly to said one of a plurality of destinations; and routing said message from said first adjunct device to said one of a plurality of destinations, thereby establishing a connection path between said one of said subscribers and said one of said plurality of destinations, wherein:

said one of a plurality of destinations is another of said subscribers connected to said switch by said first adjunct device through which said one of said subscribers is connected; and said routing step comprises connecting said message back from said first adjunct device to said another of said subscribers.

47. The method of claim 46 wherein said recognizing step comprises storing in memory associated with said switch an identification by telephone number of which subscribers are connected through which of said at least a first adjunct device.

48. The method of claim 46 further comprising the steps of:

when said connection path is established, sending a second signal from said first adjunct device to said switch advising said switch that said one of said subscribers is busy; and when said connection path is terminated, sending a third signal from said first adjunct device to said switch, advising said switch that said one of said subscribers is available.

49. The method of claim 48 further comprising the steps of:

when said connection path is established, sending a fourth signal from said first adjunct device to said switch advising said switch that said another of said subscribers is busy; and when said connection path is terminated, sending a fifth signal from said first adjunct device to said switch, advising said switch that said another of said subscribers is available.

50. A method for use in a switched telephone network, said telephone network having at least one switch for directing message traffic from one of a plurality of subscribers to a destination comprising one of (a) one of a plurality of other subscribers, and (b) a gateway of a public data network, said switch having resources for handling a predetermined maximum number of message paths at any one time, said telephone network further having (a) at least a first adjunct device associated with said switch for connecting a plurality of said subscribers to said switch and (b) a plurality of destinations connected to said switch, at least some of said destinations being some of said subscribers and at least one of said destinations being a gateway of a public data network, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said subscribers, (b) said telephone number, (c) information contained in said message, and (d) information stored at said switch;

sending a first signal from said switch to said first adjunct device instructing said first adjunct device to connect said message directly to said one of a plurality of destinations; and routing said message from said first adjunct device to said one of a plurality of destinations, thereby establishing a connection path between said one of said subscribers and said one of said plurality of destinations, wherein:

said one of a plurality of destinations is said gateway of a public data network, said public data network being connected to said switch and having a direct connection to each said at least one first adjunct device; and said routing step comprises connecting said message for said public data network over one of said direct connections.

51. The method of claim 50 wherein said recognizing step comprises storing in memory associated with said switch an identification by telephone number of said public data network, messages for which should be redirected away from said switch.

52. The method of claim 50 wherein said one of a plurality of destinations is connected to said switch by a second adjunct device having said direct connections to said at least one first adjunct device.

53. The method of claim 50 wherein said one of said direct connections operates using protocol conversion.

54. The method of claim 53 wherein:

said one of said direct connections is a packet-switched connection; and said routing step comprises routing said message using packet switching protocols.

55. The method of claim 54 wherein said routing step comprises routing said message using asynchronous transfer mode protocols.

56. The method of claim 50 further comprising the steps of:

when said connection path is established, sending a second signal from said first adjunct device to said switch advising said switch that said one of said subscribers is busy; and when said connection path is terminated, sending a third signal from said first adjunct device to said switch, advising said switch that said one of said subscribers is available.

57. A method for use in a switched telephone network, said telephone network having at least one switch for directing message traffic from one of a plurality of subscribers to a destination comprising one of (a) one of a plurality of other subscribers, and (b) a gateway of a public data network, said switch having resources for handling a predetermined maximum number of message paths at any one time, said telephone network further having (a) at least a first adjunct device associated with said switch for connecting a plurality of said subscribers to said switch and (b) a plurality of destinations connected to said switch, at least some of said destinations being some of said subscribers and at least one of said destinations being a gateway of a public data network, said method being for effectively exceeding said predetermined maximum number of message paths without increasing said resources, said method comprising the steps of:

receiving a message at said first adjunct device from one of said subscribers, said message bearing a telephone number of said one of a plurality of destinations;

passing said message from said first adjunct device to said switch;

recognizing, at said switch, that said message should be redirected away from said switch, based on at least one of (a) said subscribers, (b) said telephone number, (c information contained in said message, and (d) information stored at said switch;

sending a first signal from said switch to said first adjunct device instructing said first adjunct device to connect said message directly to said one of a plurality of destinations;

routing said message from said first adjunct device to said one of a plurality of destinations, thereby establishing a connection path between said one of said subscribers and said one of said plurality of destinations;

establishing a control channel between said switch and said first adjunct device; and sending said control signal on said control channel.

* * * * *